(12) United States Patent
Meyer et al.

(10) Patent No.: US 11,824,751 B2
(45) Date of Patent: Nov. 21, 2023

(54) SYSTEM AND METHOD FOR CONTROLLING DISTRIBUTION OF MEDIA CONTENT IN A DISTRIBUTED SYSTEM

(71) Applicant: GRASS VALLEY CANADA, Montreal (CA)

(72) Inventors: Charles S. Meyer, Crystal Bay, NV (US); James Westland Cain, Newbury (GB)

(73) Assignee: GRASS VALLEY CANADA, Montreal (CA)

( * ) Notice: Subject to any disclaimer, the term of this patent is extended or adjusted under 35 U.S.C. 154(b) by 215 days.

(21) Appl. No.: 17/233,256

(22) Filed: Apr. 16, 2021

(65) Prior Publication Data

US 2021/0328898 A1 Oct. 21, 2021

Related U.S. Application Data

(60) Provisional application No. 63/013,375, filed on Apr. 21, 2020.

(51) Int. Cl.
*G06F 15/173* (2006.01)
*H04L 43/0888* (2022.01)
(Continued)

(52) U.S. Cl.
CPC ...... *H04L 43/0888* (2013.01); *H04L 43/0894* (2013.01); *H04N 21/26216* (2013.01); *H04N 21/84* (2013.01)

(58) Field of Classification Search
CPC ............ H04L 43/0888; H04L 43/0894; H04N 21/26216; H04N 21/84
(Continued)

(56) References Cited

U.S. PATENT DOCUMENTS 9,560,422 B2 1/2017 Picconi
9,838,571 B2 12/2017 Meyer
(Continued)

OTHER PUBLICATIONS

Notification of Transmittal of the International Search Report and the Written Opinion of the International Searching Authority received in PCT/CA2021/050545; dated Jul. 13, 2021.

*Primary Examiner* — Alan S Chou
(74) *Attorney, Agent, or Firm* — ARENTFOX SCHIFF LLP (57) ABSTRACT

A system is provided for distributing media content in a distributed network. The system includes a count sequence generator that generates a monotonic increasing count sequence, a signal processor that generates a correspondence between media content and the count sequence, such that the monotonic increasing counter sequence is configured for a media content request defined by the increasing count sequence; and a media content database configured to store the media content and corresponding count sequence. Moreover, the signal processor receives a media content request that includes media request parameters that define a portion of the media content based on the corresponding count sequence and at least one of content quality, cost of the requested media content and a delivery time for the requested media content. The signal processor also accesses the requested media content from the media content database and distributes the media content to the media processing node.

20 Claims, 5 Drawing Sheets

(51) Int. Cl.
*H04L 43/0894* (2022.01)
*H04N 21/84* (2011.01)
*H04N 21/262* (2011.01)

(58) Field of Classification Search
USPC .......................................................... 709/224
See application file for complete search history.

(56) References Cited

U.S. PATENT DOCUMENTS

| | | | |
|---|---|---|---|
| 2007/0198706 A1* | 8/2007 | Mechelli | H04L 69/28 709/224 |
| 2012/0320196 A1* | 12/2012 | Overton | H04N 7/181 348/143 |
| 2013/0086142 A1* | 4/2013 | Hampel | H04W 36/0011 709/203 |
| 2013/0144979 A1* | 6/2013 | Kansal | H04N 21/2402 709/219 |
| 2013/0246608 A1* | 9/2013 | Liu | H04L 41/069 709/224 |
| 2014/0379765 A1 | 12/2014 | Rogers et al. | |
| 2015/0052571 A1 | 2/2015 | Stokking et al. | |
| 2017/0171627 A1* | 6/2017 | Cang | H04L 67/55 |
| 2019/0052689 A1 | 2/2019 | Cain | |

* cited by examiner

SYSTEM AND METHOD FOR CONTROLLING DISTRIBUTION OF MEDIA CONTENT IN A DISTRIBUTED SYSTEM

CROSS REFERENCE TO RELATED APPLICATIONS

This application claims priority to U.S. Patent Provisional No. 63/013,375, filed Apr. 21, 2020, the entire content of which are hereby incorporated by reference.

TECHNICAL FIELD

The present disclosure generally relates to media content distribution, and, more particularly, to a system and method for distributing media content in a distributed system using a sequence count.

BACKGROUND

Live television broadcasting typically involves capturing media content from a live scene (e.g., a sports venue, news broadcast, etc.), transmitting the captured content to a remote production facility where the video and audio signals are managed by production switchers, and then encoding the signals for transport to a distribution network, such as a television broadcasting network. A long standing problem for media broadcasting is to tune and sync frequency and phase of a decoder at a media device (e.g., a distribution node or a processing node such as a video receiver) to a master media timing source (e.g., a transmitter at the source of the media transport). Typically, the media production facility will attempt to coordinate the alignment and distribution of the various media streams to the media device, but propagation delays due to electrical connections, device processing, and conductor impedance of network links will generally contribute to phase offset at the downstream media devices.

As the evolution of broadcasting progressed from analog to digital domain and across various protocols (e.g., MPEG-2, Internet Protocol (IP), IPTV, Ethernet), various techniques have been developed to manage the frequency and phase sync. Local clock references, such a program clock reference ("PCR") time stamp or a presentation time stamp, provide no reference to real time. Other protocols, such as precision time protocol ("PTP"), provide time stamps infrequently, and are slow to converge on a precise phase lock due to the low refresh rate of the time stamp values. Compounding these potential problems with time stamps is where multiple unique time stamps may need to be applied independently to over a hundred audio and video feeds, each having different clock rates and phases.

PTP has currently been adopted worldwide for distributed timing for media content. There are IEEE standards, such IEEE 1588 in particular, that provide the necessary information for the stability and precision of time standards that are traceable to the International Time fountains, such as those existing in various locations worldwide. To implement such a distributed system, PTP establishes the frequency and phase of an oscillator located essentially anywhere in the world. In this way, synchronized clocks can be established in most any location and GPS satellites, for example, are one popular source of the necessary timing information. Today, there are also IP services that distribute the necessary information over the Internet, or other networks. For example, Hoptroff London and Meinberg are two companies providing Time as a Service (TaaS").

In general, TaaS is a cloud-based software system for to synchronize time across cloud devices over the Internet. TaaS synchronizes server clocks to universal time ("UTC") so that every server in the distributed system shares the same reference time and has a traceable record of its accuracy to prove its timestamps are right. While TaaS improves conventional media distribution systems using PTP to synchronize clocks throughout the distribution network, media distribution systems using a TaaS system to synchronize time for media distribution are still negatively affected by the delays due to electrical connections, device processing, and conductor impedance of network links.

Accordingly, a system and method are needed for modern time management of media production that enables a more flexible, scalable and powerful for distributing media content over network.

SUMMARY OF THE INVENTION

Thus, according to an exemplary aspect, a system and method is provided for distributing media content in a distributed system according to a count sequence. In general, the system and method utilize technique considered a Clock as a Service ("Caas") and does not require PTP or NTP ("Network Time Protocol") for media content distribution. Instead, the exemplary media distribution system implements a counter that is sampled to create a sequence of counts that are assigned to certain media landmarks, such as video frames, and/or to control streams. Moreover, in the exemplary aspect, the count sequence is monotonic increasing for the content media.

Advantageously, by using CaaS, the disclosed system and method is configured for temporal processing that be executed in a "pull" fashion by the downstream media devices (e.g., a distribution node or a processing node such as a video receiver), rather than in a "push" operation by the media production facility. As such, this process of "pulling" the media content from media production facility can be assigned to any set of resources that are available at a given time or for a given cost. In turn, once the processes and their sequence time are provided to the compute engine, media can be distributed in the pulled manner for the processing to operate on. Because each node in the media distribution network is provided its event list, count sequence, and the media, the node is free to carry out the pull process at any rate that satisfies the requirements of the media access request. For example, it can be faster than real time or slower than real time, can also be variable, as long as the process for distributing the requested media content is ensured to be complete within a specified amount or time, or at a particular time, for example. Moreover, the media access request can defined media request requirements based on feedback identifying measured bandwidth and traffic flow of the media distribution network.

Thus, according to an exemplary embodiment,

According to the exemplary system, the signal processor is configured to access the requested media content from the media content database and distribute the media content over the distributed network to the media processing node. Moreover, the signal processor is configured to control a server for distributing the media content over the distributed network to the media processing node, such that the media content is transmitted at a rate and with a content quality that the media request parameters and accounts for throughput consumption of the distributed network based on the generated latency information. Based on available volume of media transmission in the distributed network, the media request parameters can be configured to perform a self-balancing for the network to increase or decreases the allocation of signal flows through the network to adjust for dynamic measurements of available throughput and/or bottlenecks and latencies in the network.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the media content distribution system will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Figure 1:
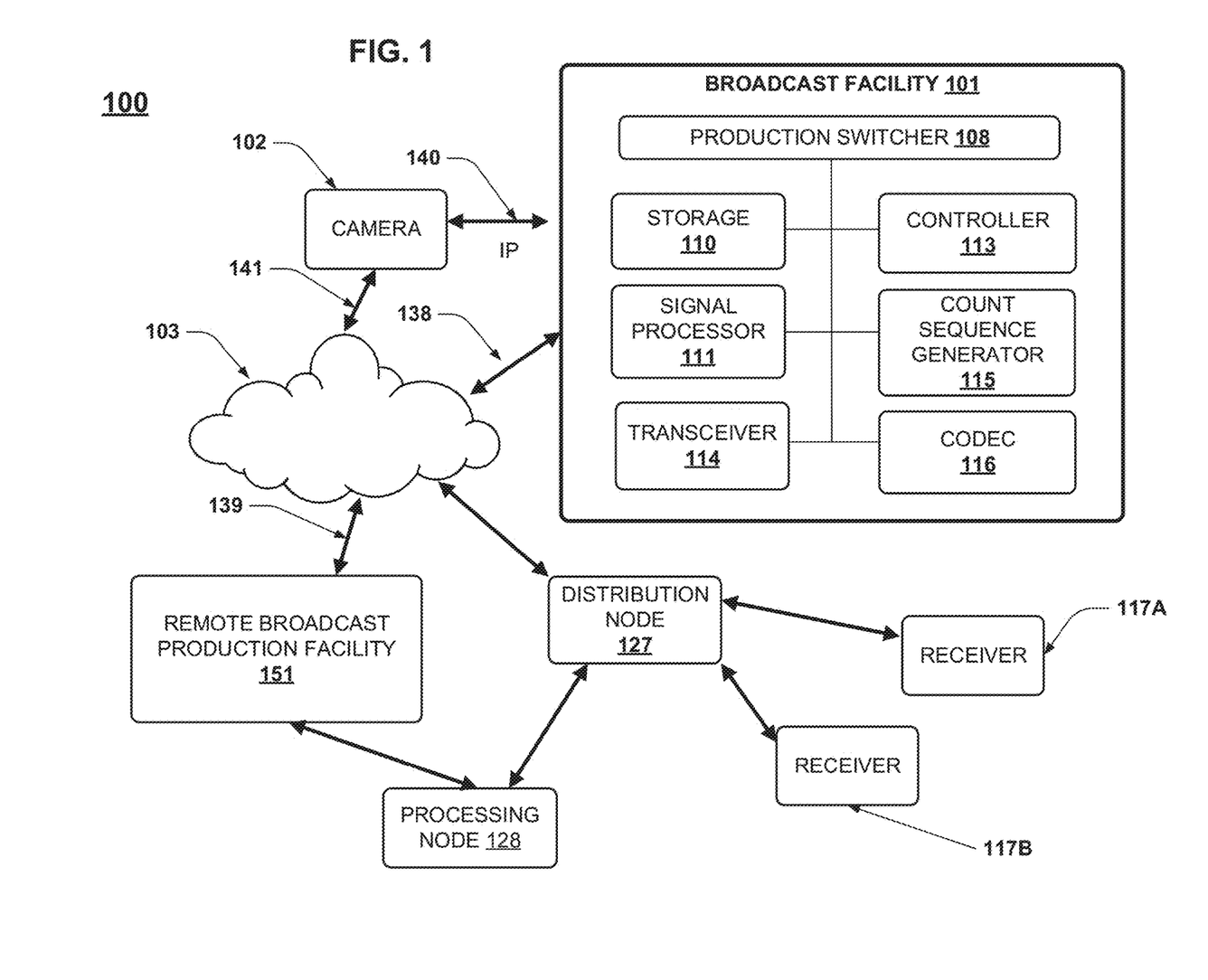
FIG. 1 illustrates a block diagram of a system for distributing media content in a distributed system using a count sequence according to an exemplary embodiment.

FIG. 1 illustrates a block diagram of a system for distributing media content in a distributed network using a count sequence according to an exemplary embodiment. As described above, the exemplary system 100 uses Clock as a Service ("Caas") transmitting/distributing media content across a network. In one aspect, the media content is referred to as "essence", which denotes media that can be consumed by a user (e.g., a video clip, an audio clip, and/or ancillary data such as captions). The premise of CaaS is that mutual essence timing is respected and is achieved by using a count sequence to control the timing of distributing the essence. The timing can be based on a count sequence (plus rate) for each essence having a start and duration, which allows for any workflow for distributing the essence to be warped faster or slower, as will be described in more detail below.

Based on the count sequences, the system 100 can define an alignment point (or sync point) that is configured for mutual alignment of media and control. Status and monitoring outputs can also be generated as part of the process, again with count sequence alignment. As a result, any process for distributing essence can be carried out at any rate, respecting only the count sequences and the mutual alignment point. In fact, as will be readily apparent from the description below, processing may even go out of order, as long as the counts travel with the data since order can always be reestablished. An example is parallel compression of video frames using a thread pool. In other words, a first set of frames of the media content can be transmitted in parallel to a second set of frames of the media content that may be subsequent in the sequence, for example. The two sets of frames may be effectively pulled if the available throughput of the media content in the network is above a bandwidth threshold (e.g., a predetermined level of available bandwidth between the transmitting and receiving devices). Moreover, the first and second sets of frames can be transmitted in parallel or in sequence to one another based on network bandwidth characteristics as will be discussed in more detail below. This configuration results in a stochastic ordering of delivered frames, but a simple ordered set keyed on frame count reapplies the ordering before content consumption. Yet another example of out of order counting is the decode vs display ordering in LongGOP encoded video.

As shown in FIG. 1, the media distribution system 100 generally includes broadcast production facility 101, remote camera 102, remote distribution node 127, processing node 128, and remote production facility 151. In an exemplary aspect, media distribution system 100 can be considered a media network for real-time production and broadcasting of video and audio content. The media distribution system 100 can include a communication network, such as the Internet 103, and/or hardware conducive to internet protocol (IP). That is, the media distribution system 100 can be comprised of a network of network servers and network devices configured to transmit and receive video and audio signals of various formats. For example, in an exemplary aspect, broadcast production facility 101 may receive video and audio signals of various formats. It should be appreciated that broadcast production facility 101 is not limited to IP.

As further shown, broadcast production facility 101 may include one or more production switchers 108, storage 110, signal processor 111, controller 113, transceiver 114, count sequence generator 115 and. Broadcast production facility 101 may be a production setup for a broadcast entity and may include one or more distribution nodes 127 (e.g., electronic devices) that are configured to distribute media content to one or more distribution nodes (e.g., remote media devices), such as receivers 117A and 117B, which can be content consuming devices, for example. It should be appreciated that while only two receivers 117A and 117B are shown, the network can include a number of content consuming devices configured to receive and consume (e.g., playout) the media content.

According to the exemplary embodiment, production switcher 108 is a distribution node for the broadcast facility 101 and may receive media content from remote camera 102, for example, and route the media content to distribution node 127 for live broadcast content to one or more receives 117A and 117B.

Furthermore, storage 110 of the broadcast facility 101 can be configured to store digital media content. That is, in an exemplary aspect, storage 110 may be a hard disk (e.g., magnetic drive), flash memory, EEPROM, and the like configure to receive and store media content. For example, in some instances, remote camera 102 may pre-record media content (e.g., pre-recorded news/interview) and transmit to storage 110 for later processing and consumption. In a refinement of the exemplary aspect, the broadcast facility 101 (or one or more components thereof) can be implemented in a cloud computing environment.

Moreover, signal processor 111 of the broadcast facility 101 can be configured to assign a count sequence to the media content stored in storage 110. For example, count sequence generator 115 can be configured to generate a numerical count in a sequential order, for example. The controller 113 can then be configured to instruct the signal processor 111 to assign the media content or essence stored in storage 110 with a corresponding sequential count of the generated sequence. For example, if the media content is a digital video stream, the signal processor 111 can be configured to assign each frame in the digital video stream (stored in storage 110) with a corresponding number in the count sequence. As will be described in greater detail below, this generated count sequence can then be provided to a device downstream (e.g., distribution node 127 or even received 117A or 117B). In turn, the downstream media processing (or consuming) node can be configured to effectively "pull" the media content based on count sequence. Because each node is provided its event list, the count sequence, and the corresponding media content, the node is free to carry out the process at any rate that meets the needs of its request.

In an exemplary aspect, controller 113 may be configured to distribute certain media (e.g., audio and video) feeds to a particular destination in the distributed network 100. As will be described in detail below, one or more downstream nodes (e.g., distribution node 127 or even receivers 117A or 117B) can obtain a "pre-queue" of the media content that is (or will become) available for distribution. This "pre-queue" information will include at least metadata relating to the media content and the count sequence (or range of count sequences) that correspond to some or all of the media content. In one exemplary aspect, the pre-queue information can be generated by the signal processor 111 and transmitted to the one or more downstream nodes. In another exemplary aspect, the pre-queue information can be stored in a remote cloud computing environment or other database that is separately accessible by the media receiving/consuming nodes.

According to the exemplary aspect, the downstream node(s) can be configured to generate a request for the media content by specifying the corresponding count sequence and additional parameters for receiving the requested media content. For example, the media delivery request can include parameters relating to quality (e.g., video resolution), cost and/or delivery time. In turn, the controller 113 of the broadcast facility 101 can be configured to analyze the media content request and transmit the content to the node that is effectively being "pulled" by that node, as long as the requested media content satisfies the media request parameters. For example, if the request specifies that the content is delivered in 24 hours, the controller can be configured to transmit a higher resolution of the media content that would take longer for total transmission. In contrast, if the media content must be delivered in one half hour, the controller 113 can be configured to transmit the media content at a lower resolution. Thus, the controller 113 can be configured to dynamically determine the quality (e.g., resolution and format of the delivered content) based on the requested delivery time.

In another exemplary aspect, the controller 113 can be configured to send the media content to codec 116 for encoding in the video signals at a particular compression format for the transmission to satisfy the media request parameters. In general, codec 116 is configured to perform encoding of video and audio data into data packets for transmission over IP in the media distribution network. In some examples, codec 116 may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

Yet further, transceiver 114 can further be configured to process the media content signals encoded by codec 116 and transmit the encoded media streams to the requesting node (e.g., distribution node 127 or even received 117A or 117B) over the Internet 103. In one aspect, the transceiver 114 can include (or be coupled to) one or more servers configured to transmit the information to the requesting node as would ab appreciated to one skilled in the art. Moreover, in this network. distribution node 127 can further be configured to distribute the media content throughout the distribution network to one or more processing node(s) 118. In addition, remote distribution node 127 may feed remote processing node(s) 128 via a direct link 142, or via internet 103 connection. Examples of remote distribution node(s) 127 and processing node(s) 128 may include remote production switches similar to production switch 108 or remote signal processors similar to signal processor 111.

According to an exemplary aspect of FIG. 1, remote camera 102 can be an IP device, configured for the A/V feed to the broadcast production facility 101 to use IP over an Ethernet connection 140. In an exemplary aspect, remote camera 102 can be configured for an A/V feed across links 141 and 138 via the internet 103. Moreover, in an exemplary aspect, remote camera 102 can include a count sequence generator 115 configured to generate the count sequence for the media content. Moreover, it should be appreciated that while the exemplary aspect uses remote camera 102 (which may be located at a live event, for example), a similar configuration can be used for a remote video server, for example, that is configured to store media content with a count sequence and distribute this content through the media distribution network using the exemplary techniques described above.

It is noted that remote production facility 151 can include some or all of the same components of broadcast production facility 101. Moreover, remote production facility 151 may exchange transmissions with the broadcast production facility 101 across the Internet 103 connection via links 138, 139. Aspects of implementing the remote production facility 151 may include a live production setup on location at a sports or entertainment venue, where multiple remote cameras 102 and audio recorders may feed through controllers at the remote production facility 151 and fed to broadcast production facility 101 for media content distribution and/or broadcasting across the network. It should be appreciated that the pull technique enables overall orchestration of activity for a number of processing events that are distributed across a number of processing nodes as shown in system 100, for example.

As described above, by providing a count sequence to the media content, this technique enables temporal processing of the media distribution to be executed in a "pull" fashion by the node requesting to receive the media content. The process can be assigned to any set of resources that might be available at a given time or for a given cost, as defined by the media request parameters, for example. In turn, once the processes and their sequence time are provided to the compute engine (e.g., controller 113), media can be pulled (e.g., from storage 110) for the processing to operate on. Moreover, it should be appreciated that the duration of the media content can be used as a way to establish real time. If the count sequence is periodic, the duration of the requested media content will equal the total count sequence times the time per count.

Figure 2:
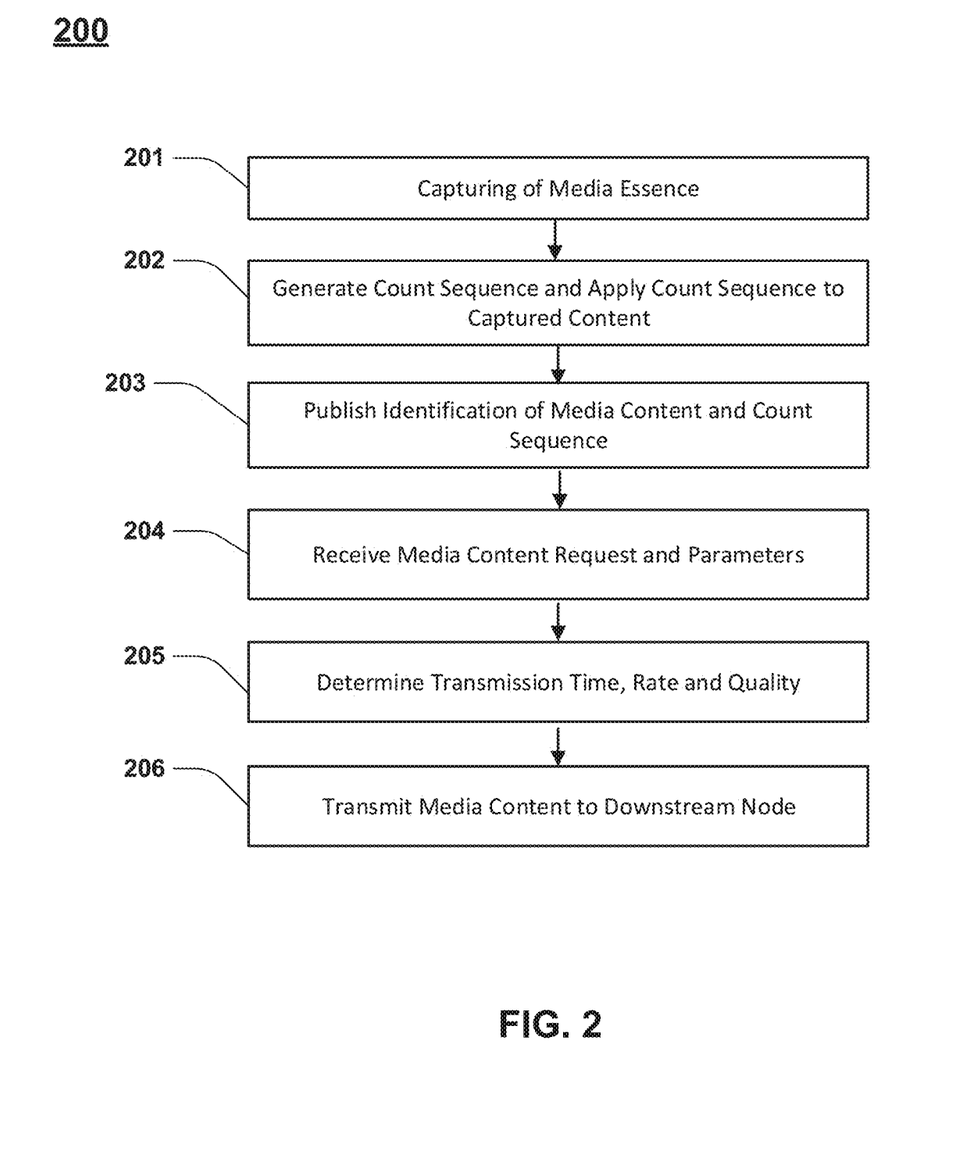
FIG. 2 illustrates a flowchart for a method for distributing media content in a distributed system using a count sequence according to an exemplary embodiment.

FIG. 2 illustrates a flowchart for a method for distributing media content in a distributed system using a count sequence according to an exemplary embodiment. In an exemplary aspect, it is noted that the method 200 can be performed using one or more of the components described above with respect to FIG. 1.

As shown, media essence (e.g., video or audio content) is captured or otherwise stored at Step 201. At Step 202, a count sequence generator (such as generator 115) is configured to generate a count sequence that is applied or associated with the captured media content. As described above, the count sequence is monotonic increasing and is defined for the media content as a reference and defined for the duration of the such content.

Next, at Step 203, an identification of the media content and the corresponding count sequence is made available or otherwise published to one or more downstream media receiving nodes that may wish to "pull" the media content at some later point in time. For example, a listing of available (or to be available in the future) media content can be published on a website, a file server or the like, and can also include the count sequence for the duration of the media content and available content qualities, etc. As a result, the media requesting nodes can access this published information to generate the media content request with defined parameters for the content (e.g., required time and content quality).

It should be appreciated that while the exemplary aspect describes the count sequence as being generated after the media content is captured, in an alternative aspect, the identification of the media content and the corresponding count sequence can be made available for future events. For example, a live sporting event or concert. In this aspect, the downstream media receiving nodes can further be enabled to pull the content as it becomes available based on the count sequence. Thus, in the live recording scenario, when the downstream node (e.g., client device 117A or 117B) can predict a certain cadence, it can be configured to register a pull request for a counted payload before it is available—i.e., by pre-queueing into the future (i.e. registering multiple futures concurrently). These futures are transmitted as soon as the counted payload is available. Advantageously, this configuration generates as low latency as a push model.

Next, at Step 204, the compute engine (e.g., controller 113) receives a media content request from a downstream node that includes the count sequence corresponding to the requesting media content and one or more media request parameters, which can define requested content quality (e.g., video resolution), cost and/or delivery time. In response to the request, the compute engine (e.g., controller 113) then determines the required transmission time, rate, quality and the like, to transmit the requested content to the requesting downstream node, such that the transmitting is based on the generated count sequence (Step 205). Finally, at Step 206, the media content is delivered to the requesting downstream node based on the determined transmission time, rate, quality. Effectively, the media content has effectively been pulled by the requesting node according to the count sequence.

In a refinement of the exemplary aspect, the system and method can be configured to compensate for latency across the distribution network. As described above, when distributing media streams across a network, there can be propagation delays due to electrical connections, device processing, and conductor impedance of network links. In this aspect, the system can be configured to compensate for such delays.

In general, it should be appreciated that if the goal is minimal latency, the requirement for CaaS would be that the pull request could be orchestrated with a fixed, short pre-queue time. This configuration would require that the command delivery and command parsing, and command execution times be known. The pre-queue time is then included as part of the overall latency, and this criteria is satisfied to meet the goal. A goal which is typically generated by human operator needs. As a short example, −150 to −200 msec can be tolerated for certain human-machine interoperability, or interface.

In an exemplary aspect, if the total latency of the network and processing is assumed to be approximately 100 seconds, for example (or 6 video frames at 60P—60 frames progressive) then 50 msec could be incurred for CaaS Pull, without loss of user perceived responsiveness and with the gain of elastic, distributed control and processing.

In yet another exemplary aspect, the PTP or NTP clock can be used as the count sequence. Such a configuration will provide traceability to real time for any duration, and if desired, it provides the ability to set the exact wall clock time for events, if desired or required. This configuration provides an exact mutual time alignment point. Finally, most standards, such as SMPTE 2110-20, AES-67 and RFC 4175 provide guidance on how to integrate PTP time stamps into audio and video streams. The guidance offered means that you can time align media essence streams that might have very large time offsets. For example, a video stream is capture years ago and now it needs to be aligned with video captured today. They both respect that the "start of frame" is indicated by a new time stamp value. Therefore, media can be aligned based on the change in value, should the exact value have a large offset. In yet another aspect of this example, a remote feed, with long latency of travel, can be justified to local time, or local time can be delayed so that all time stamps align.

Figure 3:
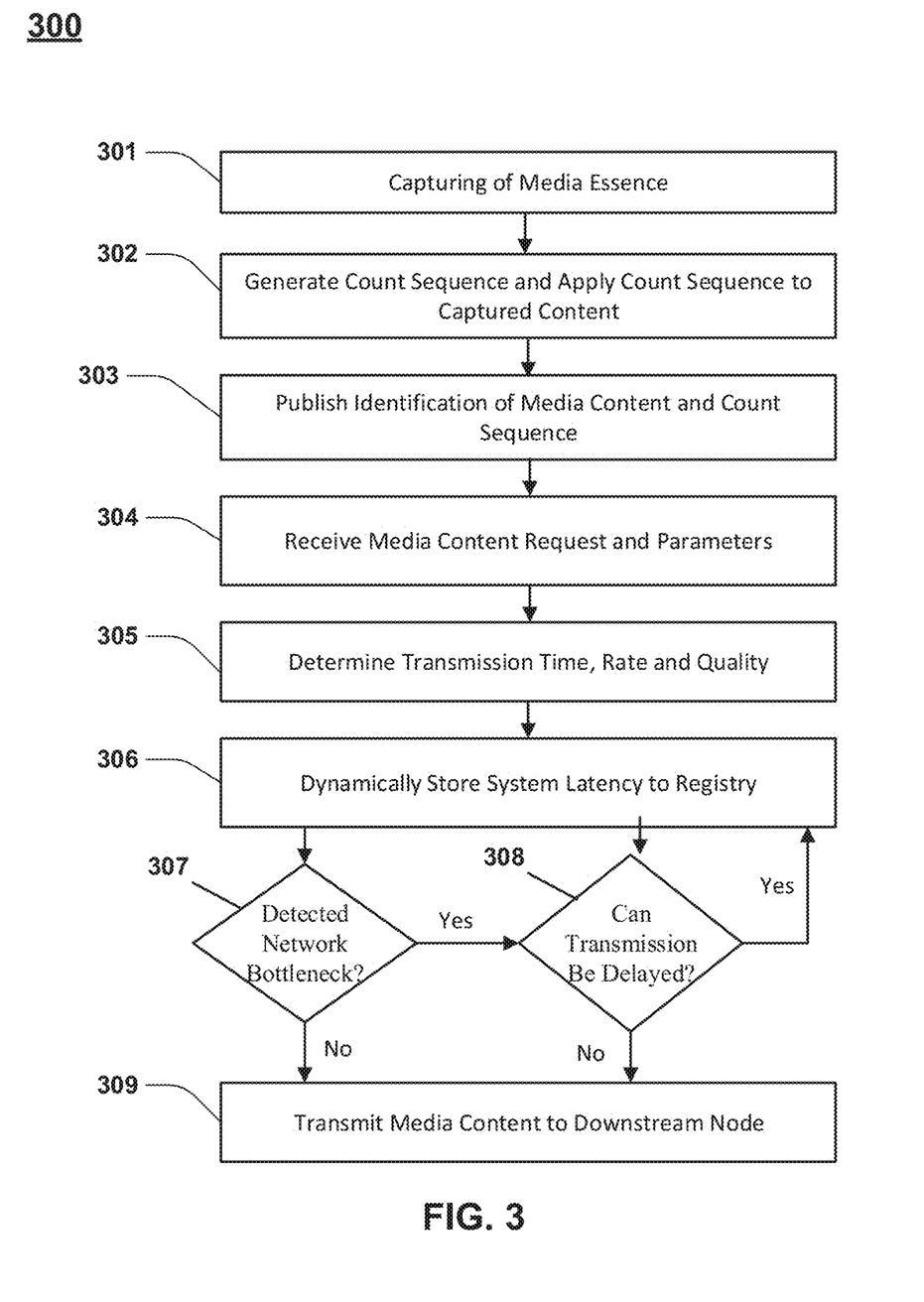
FIG. 3 illustrates a flowchart for a method for distributing media content in a distributed system using a count sequence according to another exemplary embodiment.

In yet another exemplary aspect, the exemplary system and method can implement a feedback loop to manage media content distribution in response to a pull media content request from a downstream node. FIG. 3 illustrates a flowchart for a method for distributing media content in a distributed system using a count sequence according to another exemplary embodiment.

In general, it should be appreciated that method 300 is a refinement of method 200 described above. Thus, Steps 301-305 correspond to steps 201-205 as described above. That is, media essence (e.g., video or audio content) is captured or otherwise stored at Step 301 and a count sequence generator (such as generator 115) generates a count sequence that is applied or associated with the captured media content at Step 302. Next, at Step 303, an identification of the media content and the corresponding count sequence is made available or otherwise published to one or more downstream media receiving nodes that may wish to "pull" the media content at some later point in time. At Step 304, the compute engine (e.g., controller 113) receives a media content request from a downstream node that includes the count sequence corresponding to the requesting media content and one or more media request parameters, which can define requested content quality (e.g., video resolution), cost and/or delivery time. In response to the request, at Step 305 the compute engine (e.g., controller 113) the determines the required transmission time, rate, quality and the like, to transmit the requested content to the requesting downstream node, such that the transmitting is based on the generated count sequence.

According to the exemplary aspect, in order for a device (e.g. one or more of the nodes described above with respect to FIG. 1) to be part of the media distribution network using CaaS, each device must respect the use of the count sequence for the media. In this aspect, at Step 306, each device is configured to source and report its latency to a registry (e.g., storage 110 or in a cloud ecosystem) where the information is stored and attributed to its identity.

Figure 4:
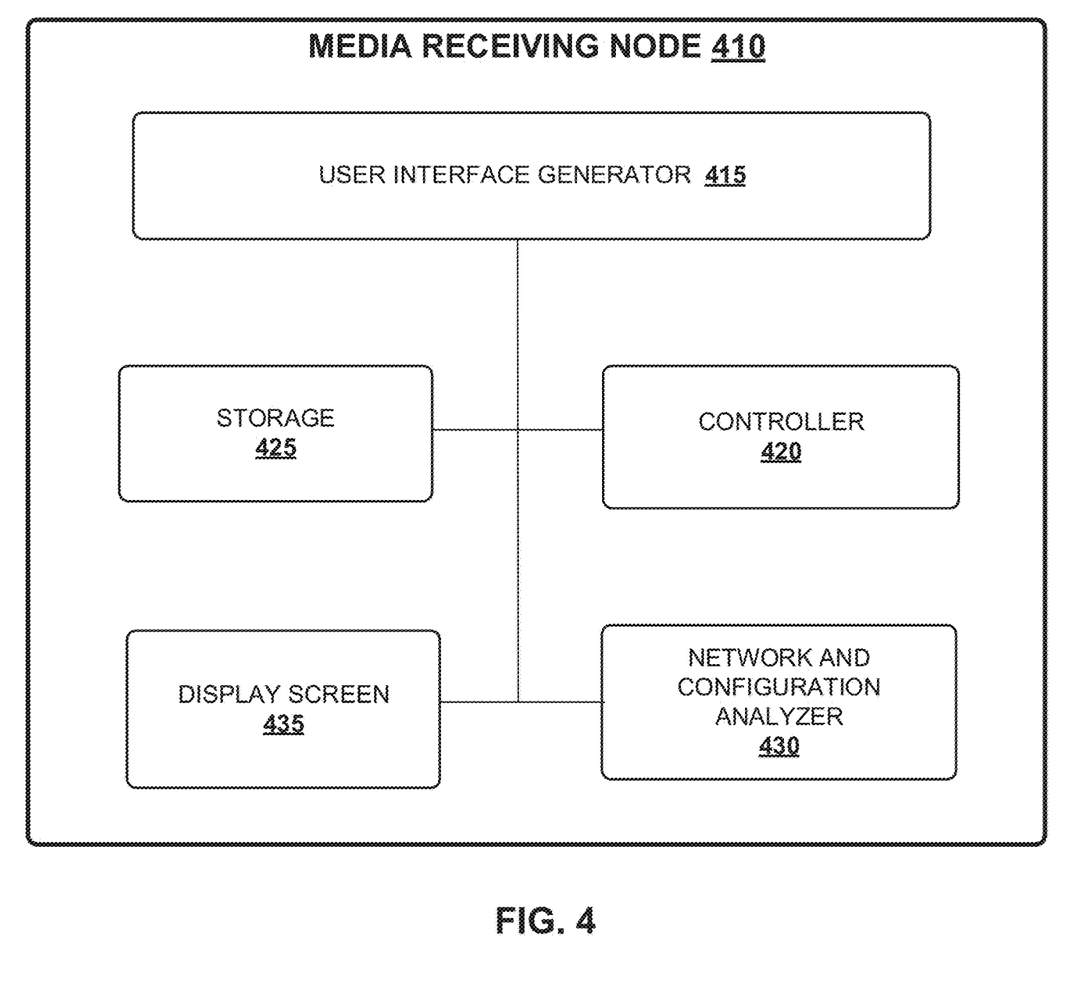
FIG. 4 illustrates a block diagram of a media device for receiving media content in a distributed system using a count sequence according to an exemplary embodiment.

FIG. 4 illustrates a block diagram of a media device for receiving media content in a distributed system using a count sequence according to an exemplary embodiment. In general, the media device (shown as a media receiving node 410) can be any type of node described above with respect to FIG. 1 provide for receiving the media content from broadcast facility 101). For example, in an exemplary embodiment, the media receiving node 410 can be one of receiver 117A or 117B, but can also be other nodes, such as broadcast production facility 151, distribution node 127 or processing node 128, for example. Thus, the media receiving node 410 can be implemented on one or more computing devices that is communicatively coupled to the network 103 for media content distribution and consumption as shown above. Moreover, the media receiving node 410 includes a plurality of components for executing the algorithms and techniques described herein.

More specifically, the media receiving node 410 can include a user interface generator 415, a controller 420 (e.g., one or more processing components), storage 425, network and configuration analyzer 430, and a display screen 435. In general, the storage 425 can be implemented as electronic memory configured to store the "pre-queue" information, as discussed above, that includes metadata relating to the media content and the count sequence (or range of count sequences) that correspond to some or all of the media content. This pre-queue information can be received by the signal processor 111 or alternatively received from a remote cloud computing environment or other database that is separately accessible by the media receiving node 410.

In an exemplary aspect, user interface generator 415, controller 420, and network and configuration analyzer 430 can be implemented as software engines or modules configured as module for executing the algorithms disclosed herein, for example. As described above, receivers 117A and 117B (e.g., the media receiving node 410) can be configured to generate and transmit a media content request that includes the count sequence corresponding to the requesting media content and one or more media request parameters, which can define requested content quality (e.g., video resolution), cost and/or delivery time. In one aspect, the user interface generator 415 is configured to generate the interface that can be displayed on display screen 235, for example, that enables the user to define the various parameters that are included in the media content request. Moreover, the display screen 235 can be configured to receive and display the media content that is ultimately delivered in response to this request, which is effectively being pulled by the requesting node (e.g., media receiving node 410) according to the count sequence.

As also described above, the system can be configured to compensate for latency across the distribution network. When distributing media streams across a network, there can be propagation delays due to electrical connections, device processing, and conductor impedance of network links. In this aspect, the system (and specifically controller 420) can be configured to compensate for such delays and bandwidth constraints. Thus, as shown, the media receiving node 410 includes network and configuration analyzer 430 that is coupled to the media distribution network and/or cloud and configured to receive information (e.g., latency, format quality, throughput, CPU usage) from each component and each system connection. In an exemplary aspect, when each node is added as a component to the media distribution network shown in FIG. 1 and described above, the network can be configured to monitor data, such as CPU usage, memory consumption, bandwidth, latency, and the like. Thus, when these individual nodes are deployed in the network, the platform in turn can transmit this node analysis information (e.g., latency, format quality, throughput, CPU usage) to the network and configuration analyzer 430 of a particular media receiving node 410. This information can be used to perform aspects the optimization algorithms and techniques described herein. Effectively, one or more nodes for receiving media content in system 100 can be configured as a feedback loop to monitor and control network bottleneck and account for system delays as described above.

For example, network routers and switches (e.g., distribution node 127) can collect (e.g., by a network and configuration analyzer 430) and can provide this latency information based upon their ports and their internal routing implementation. Moreover, virtual devices (e.g., processing node 128) can similarly collect and provide this information upon instantiation, and the information should be removed upon extinction of the device. In one aspect, using PTP protocol provides a standardized way to measure and present this latency data for the registry, for example, in storage 425, storage 110 or the like. This can be done without loss of generality for behavior.

Thus, according to the exemplary aspect, each device dynamically or periodically provides this latency information to the registry at Step 306. It is noted that while Step 306 is shown in sequence of method 300, Step 306 can be performed in parallel and continuously to one or more of the steps of the method.

Using the latency registry, the compute engine (e.g., controller 113 and/or controller 420) is configured to monitor network bottlenecks, available network throughput, and the like, at Step 307. If no network bottleneck is detected at Step 307, the method proceeds to Step 309 where the media content is delivered to the requesting downstream node based on the determined transmission time, rate, quality. Depending on available channels and throughputs, the ranges of media content can be requested concurrently (i.e., to fill available media transmission pipelines and allocate signal flow through the network) or sequentially to create a self-balancing to adjust for variances in available network resources. Thus, if a bottleneck is detected at Step 307 (e.g., by controller 420 and/or controller 113), the method proceeds to Step 308 to determine whether the transmission can be delayed and still satisfy the requirement for delivery time of the media content based on the media request parameters set by user interface generator 415 and as discussed above. If not, the method again proceeds to Step 309 where the media content is delivered to the requesting downstream node based on the determined transmission time, rate, quality. Otherwise, the method returns to Step 306 where the network latencies are monitored to determine a best time for distributing the media content. Effectively, the system is configured as a feedback loop to monitor and control network bottleneck and available throughput to effectively account for system delays and self-balance network resources, as described above.

In yet an alternative aspect, the downstream node (e.g., distribution node 127) can be configured to obtain from the registry (e.g., storage 110) the latency information of the media distribution system 100. By doing so, the downstream node can dynamically monitor the network and potential bottlenecks and then issue the media content request as a pull request at a time instance in which there is sufficient network availability to deliver the media content at a specified time and/or at a specified content quality.

In yet another exemplary aspect, there may be additional situations where the additional latency of Pull cannot be afforded. In this case, a push model can be implement in which the latency information in the registry is used to set the ideal buffer depth of receivers as well as the additional buffer offset required to achieve a given level of confidence that buffers will not overflow based on jitter and time jumps associated with switching in the network. An example of a system for allocating sufficient buffer depth is described in U.S. Pat. No. 10,455,126, issued on Oct. 22, 2019, entitled "Precision Timing for Broadcast Network", the contents of which are hereby incorporated by reference.

According to the exemplary system and method described above, the rate at which content is pulled and consumed can be varied to maximize quality of the content. In other words, the rate can be dynamically adjusted using the "pulling" of media content as described above rather than a conventional system that pushes media content through the network. Advantageously, the rate can be changed to get a benefit for cost and/or balance the through throughput due to network bottlenecks. Moreover, using a network latency registry that can be dynamically or periodically adjusted, the distribution of media content can also be dynamically increased or decreased according to this feedback data. As a result, if the broadcast facility 101 understands the throughput availability of the distribution channels, the broadcast facility 101 can determined the lowest rate that satisfies the media request parameters and, if necessary, increase the rate slightly as a small error threshold. It should be appreciated that this system is configured to effectively address network bottlenecks and throughput limitations when thousands or even millions of consumers are requesting the same content, but at different times or rates. In this situation, the broadcast facility 101 is configured to dynamically adjust the transmission rates to address these issues as discussed above.

Using the sequence count, a media stream can be distributed in two or more parallel streams, which provides the essence effectively faster than real time. Using the same count sequence, the downstream receiving node can then rebuild a single media stream according to the sequence count. Thus, media distribution can effectively be performed in parallel or out of order, for example.

Figure 5:
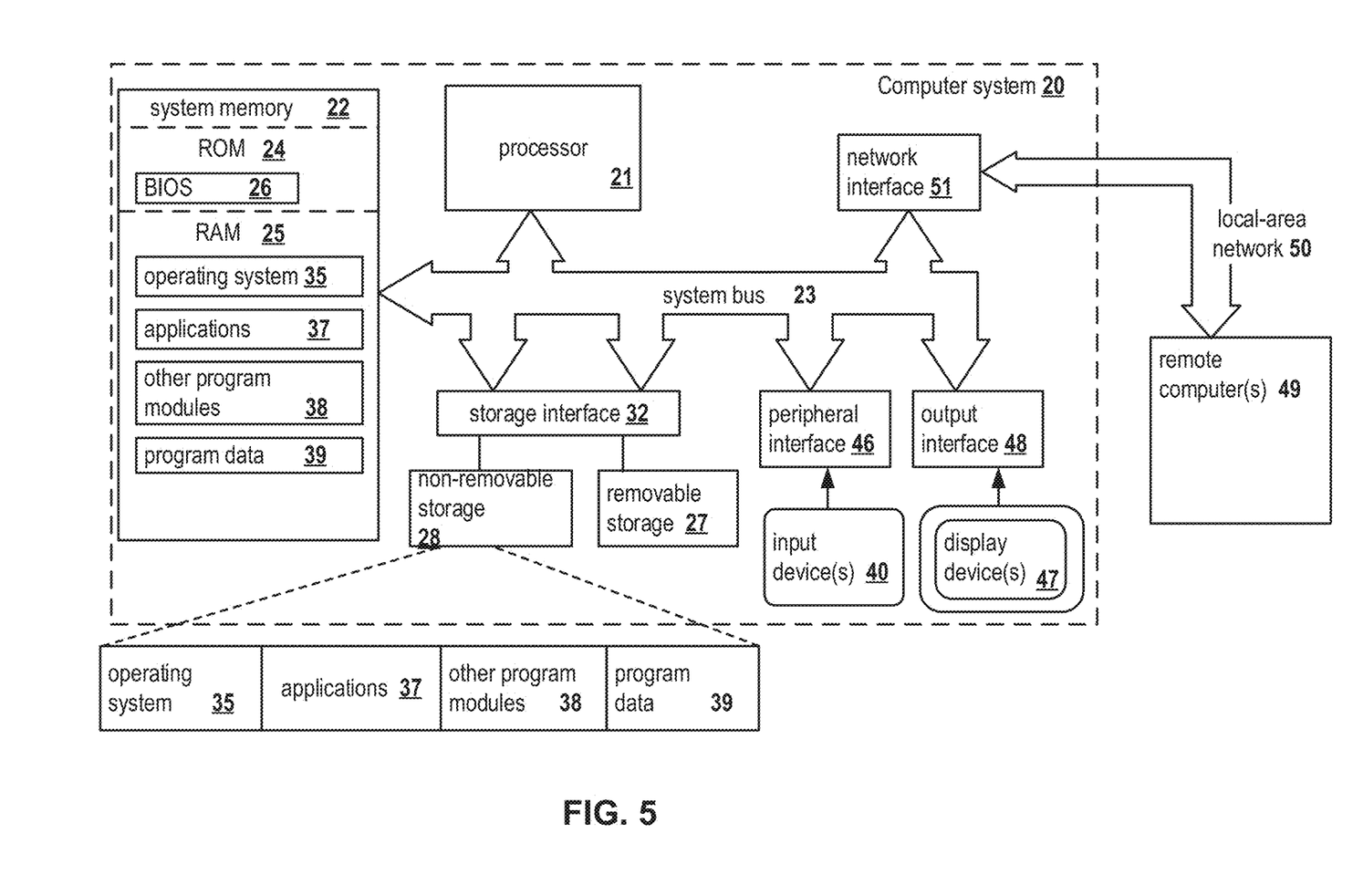
FIG. 5 is a block diagram illustrating a computer system on which aspects of systems and methods for distributing media content in a distributed system in accordance with exemplary aspects of the present disclosure.

FIG. 5 is a block diagram illustrating a computer system on which aspects of systems and methods for distributing media content in a distributed system in accordance with exemplary aspects of the present disclosure. It should be noted that the computer system 20 can correspond to any computing system configured to execute the broadcast facility 101 or any components therein, including, for example, media receiving node 410. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to file storage 110.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIG. 1.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 1, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for distributing media content in a distributed network, the system comprising:
a memory; and
a processor configured to implement instructions on the memory so as to provide:
a media content generator configured to generate media content having a plurality of video frames;
a count sequence generator configured to generate a monotonic increasing count sequence;
a signal processor configured to generate a correspondence between the media content and the monotonic increasing count sequence, such that the monotonic increasing count sequence is configured for a media content request based on a duration of the media content defined by the monotonic increasing count sequence;
a media content database configured to store the media content and corresponding count sequence;
a media processing node located remotely over the distributed network and configured to generate a media content request that is configured to pull requested media content from the media content database, with the media content request including media request parameters that define the duration of the requested media content based on the corresponding count sequence, wherein the media request parameters further define at least one of content quality, cost of the requested media content and a delivery time for the requested media content;
a latency registry configured to monitor latency and traffic bottleneck of the distributed network in order to dynamically generate latency information of the distributed network;
wherein the signal processor is configured to access the requested media content from the media content database and distribute the media content over the distributed network to the media processing node; and
wherein the signal processor is configured to control a server for distributing the media content over the distributed network to the media processing node, such that the media content is transmitted at a rate and with a content quality that the media request parameters and self-balance throughput consumption of the distributed network based on the generated latency information.

2. The system according to claim 1, wherein the signal processor is further configured to assign each frame of the plurality of video frame with a corresponding number in the monotonic increasing count sequence to generate the correspondence between the media content and the monotonic increasing count sequence.

3. The system according to claim 1,
wherein the signal processor is further configured to generate a pre-queue information that includes an event list with metadata that identifies the correspondence for the media content and the monotonic increasing count sequence, and
wherein the media processing node is configured to generate the media content request to include a portion of the monotonic increasing count sequence defined in the pre-queue information that corresponds to the defined duration of the requested media content.

4. The system according to claim 1, wherein the media processing node includes a network and configuration analyzer that is configured to obtain information relating to bandwidth and available throughput of the media content in the distributed network, and the media processing node is further configured to dynamically adjust at least one of the media request parameters based on the obtained information relating to the distributed network.

5. The system according to claim 4, wherein the media processing node is further configured to generate the media content request to pull two separate portions of the requested media content from the server in parallel when the available throughput of the media content in the distributed network is above a bandwidth threshold.

6. The system according to claim 1, wherein the media processing node is further configured to predict a cadence for future media content to determine a corresponding count sequence of the future media content, and to further generate the media content request to pull the future media content as it becomes available.

7. A system for distributing media content in a distributed network, the system comprising:

a memory; and a processor configured to implement instructions on the memory so as to provide:

a media content generator configured to generate media content having a plurality of video frames;

a count sequence generator configured to generate a monotonic increasing count sequence;

a signal processor configured to generate a correspondence between the media content and the monotonic increasing count sequence, such that the monotonic increasing count sequence is configured for a media content request based on a duration of the media content defined by the monotonic increasing count sequence;

a media content database configured to store the media content and corresponding count sequence; and a latency registry configured to monitor latency and traffic bottleneck of the distributed network in order to dynamically generate latency information of the distributed network;

wherein the signal processor is configured to receive a media content request from a media processing node, with the media content request including media request parameters that define the duration of the requested media content based on the corresponding count sequence, with the media request parameters further defining at least one of content quality, cost of the requested media content and a delivery time for the requested media content; and wherein the signal processor is configured to access the requested media content from the media content database and distribute the media content over the distributed network to the media processing node; and wherein the signal processor is configured to control a server for distributing the media content over the distributed network to the media processing node, such that the media content is transmitted at a rate and with a content quality that the media request parameters and self-balance throughput consumption of the distributed network based on the generated latency information.

8. The system according to claim 7, wherein the signal processor is further configured to assign each frame of the plurality of video frame with a corresponding number in the monotonic increasing count sequence to generate the correspondence between the media content and the monotonic increasing count sequence.

9. The system according to claim 7, wherein the signal processor is further configured to generate a pre-queue information that includes an event list with metadata that identifies the correspondence for the media content and the monotonic increasing count sequence, and the media content request includes a portion of the monotonic increasing count sequence defined in the pre-queue information that corresponds to the defined duration of the requested media content.

10. The system according to claim 7, further comprising a network and configuration analyzer that is configured to obtain information relating to bandwidth and available throughput of the media content in the distributed network, and wherein at least one of the media request parameters is dynamically adjusted based on the obtained information relating to the distributed network.

11. The system according to claim 10, wherein the generated media content request is configured to pull two separate portions of the requested media content from the server in parallel when the available throughput of the media content in the distributed network is above a bandwidth threshold.

12. The system according to claim 7, further comprising the media processing node that is configured to predict a cadence for future media content to determine a corresponding count sequence of the future media content, and to further generate the media content request to pull the future media content as it becomes available.

13. A system for distributing media content in a distributed network, the system comprising:

a memory; and a processor configured to implement instructions on the memory so as to provide:

a count sequence generator configured to generate a monotonic increasing count sequence;

a signal processor configured to generate a correspondence between media content having a plurality of video frames and the monotonic increasing count sequence, such that the monotonic increasing count sequence is configured for a media content request defined by the monotonic increasing count sequence; and a media content database configured to store the media content and corresponding count sequence;

wherein the signal processor is configured to receive a media content request from a media processing node, with the media content request including media request parameters that define a portion of the media content based on the corresponding count sequence, with the media request parameters further defining at least one of content quality, cost of the requested media content and a delivery time for the requested media content; and wherein the signal processor is configured to access the requested media content from the media content database and distribute the media content over the distributed network to the media processing node.

14. The system according to claim 13, further comprising a latency registry configured to monitor latency and traffic bottleneck of the distributed network in order to dynamically generate latency information of the distributed network.

15. The system according to claim 14, wherein the signal processor is configured to control a server for distributing the media content over the distributed network to the media processing node, such that the media content is transmitted at a rate and with a content quality that the media request parameters and self-balance throughput consumption of the distributed network based on the generated latency information.

16. The system according to claim 13, wherein the signal processor is further configured to assign each frame of the plurality of video frame with a corresponding number in the monotonic increasing count sequence to generate the correspondence between the media content and the monotonic increasing count sequence.

17. The system according to claim 16, wherein the signal processor is further configured to generate a pre-queue information that includes an event list with metadata that identifies the correspondence for the media content and the monotonic increasing count sequence, and the media content request includes a portion of the monotonic increasing count sequence defined in the pre-queue information that corresponds to a defined duration for the requested media content.

18. The system according to claim 15, further comprising a network and configuration analyzer that is configured to obtain information relating to bandwidth and available throughput of the media content in the distributed network, and wherein at least one of the media request parameters is dynamically adjusted based on the obtained information relating to the distributed network.

19. The system according to claim 18, wherein the generated media content request is configured to pull two separate portions of the requested media content from the server in parallel when the available throughput of the media content in the distributed network is above a bandwidth threshold.

20. The system according to claim 13, further comprising the media processing node that is configured to predict a cadence for future media content to determine a corresponding count sequence of the future media content, and to further generate the media content request to pull the future media content as it becomes available.

\* \* \* \* \*